United States Patent [19]

Kalkomey et al.

[11] Patent Number: 4,577,297
[45] Date of Patent: Mar. 18, 1986

[54] METHOD FOR ENHANCING RECORDED MARINE SEISMIC REFLECTION SIGNALS HAVING UNDULATING WATER BOTTOM DISTORTIONS

[75] Inventors: Cynthia T. Kalkomey, Irving; Thomas J. Mason, Dallas; Keh Pann, Richardson, all of Tex.

[73] Assignee: Mobil Oil Corporation, New York, N.Y.

[21] Appl. No.: 753,818

[22] Filed: Jul. 9, 1985

Related U.S. Application Data

[63] Continuation of Ser. No. 372,273, Apr. 27, 1983, abandoned.

[51] Int. Cl.$^4$ .......................... G01V 1/38; G01V 1/00
[52] U.S. Cl. ........................................ 367/24; 367/15; 367/38
[58] Field of Search ....................... 367/15, 16, 17, 18, 367/19, 20, 21, 22, 24, 38, 50, 59, 73; 364/421

[56] References Cited

U.S. PATENT DOCUMENTS

| | | | |
|---|---|---|---|
| 23,552 | 9/1952 | Babb et al. | 367/16 |
| 2,241,428 | 5/1941 | Silverman | 367/16 X |
| 2,423,591 | 7/1947 | Flude | 367/16 |
| 2,449,085 | 9/1948 | Peterson | 367/16 |
| 2,465,696 | 3/1949 | Paslay | 367/16 X |
| 2,757,356 | 7/1956 | Haggerty | 367/20 X |
| 3,489,996 | 1/1970 | Moon et al. | 367/24 X |
| 3,629,800 | 12/1971 | Schneider | 367/24 |
| 4,079,353 | 3/1978 | Jenkinson | 367/15 |
| 4,380,059 | 4/1983 | Ruehle | 367/46 |
| 4,464,737 | 8/1984 | Pann | 367/49 |
| 4,486,865 | 12/1984 | Ruehle | 367/24 |

OTHER PUBLICATIONS

J. A. Coffeen, Seismic Exploration Fundamentals PPC Books, Tulsa OK 5/23/80, pp. 48, 49, 125-129, 239-243.
Backus, Water Reverberations-Their Nature and Elimination, Geophysics vol. XXIV, No. 2, (Apr. 1, 1959), pp. 233-261.
*Methods of Numerical Mathematics,* Marchuk, G. I., Springer-Verlag, 1975.
*Stanford Exploration Project* (Stanford, California: Leland Stanford Junior University) Report No. 15, "Modeling and Migration with the Monochromatic Wave Equation—Variable Velocity and Attenuation", Kjartansson, E., 1978.

*Primary Examiner*—Charles T. Jordan
*Assistant Examiner*—Brian S. Steinberger
*Attorney, Agent, or Firm*—A. J. McKillop; Michael G. Gilman; George W. Hager, Jr.

[57] ABSTRACT

In marine seismic exploration, seismic energy is transmitted through a water layer into the earth and seismic reflection signals from subsurface interfaces are recorded. Any undulating water bottom distortion in the recorded reflection signals is removed by replacing the seismic energy velocity in the water layer with a velocity matching that of the earth medium below the water bottom.

1 Claim, 10 Drawing Figures

METHOD FOR ENHANCING RECORDED MARINE SEISMIC REFLECTION SIGNALS HAVING UNDULATING WATER BOTTOM DISTORTIONS

This is a continuation of copending application Ser. No. 372,273, filed on Apr. 27, 1983 now abandoned.

BACKGROUND OF THE INVENTION

The invention relates to a method of determining the presence and location of seismic reflections from the earth's subsurface formations.

In marine seismic exploration, seismic energy is generated in the water layer above the earth's surface, is reflected from subsurface interfaces between layers of the earth, and is received by hydrophones located in the water layer or on the earth's surface at the bottom of the water layer. The hydrophone signals are recorded in the form of a seismic time section. This seismic time section contains information which can be used to represent the characteristics of the subsurface formations.

Primary reflection signals on the seismic time section indicate the presence of a subsurface reflecting interface, and time occurances of these primary reflection signals represent the depth of the subsurface reflecting interface. Furthermore, the time-shift or attitude of a primary reflection from trace-to-trace indicates the dip or slope of the subsurface interface.

It has long been known that seismic data collected over a deep and undulating water bottom and viewed as seismic time sections, represent a highly distorted picture of subsurface interfaces. Conventional data processing techniques of velocity analysis, normal moveout corrections, and CDP stacking is based on an undistorted model for which relatively flat underlying structures are characterized by hyperbolic moveout on seismic time sections. However, in the presence of significant water bottom distortion, flat, subsurface reflecting structures cannot be characterized by hyperbolic moveout. Consequently, stacking velocities not only become more difficult to estimate, but must be estimated at more frequent intervals in order to produce an acceptable stacked time section. Furthermore, the stacked section will be of less quality (i.e., display less trace-to-trace coherency at reflecting interfaces), and the interpretation of stacking velocities becomes more difficult.

SUMMARY OF THE INVENTION

In marine seismic exploration seismic energy is transmitted through a water layer into the earth and seismic reflection signals from subsurface interfaces are recorded. Enhanced seismic reflection signals are produced in accordance with the present invention by the elimination of undulating water bottom distortion in the recorded seismic reflection signals. Such elimination is carried out by the removal and replacement of the water layer velocity effect on the recorded seismic reflection signals with a velocity effect that would have been present if the water layer had been replaced with a medium having the velocity of the earth medium below the water bottom.

More particularly, first simulated seismic reflection signals are produced from the recorded seismic reflection signals that would have been recorded with the receivers moved from within the water layer to a location below the water bottom. Second simulated seismic reflection signals are produced from the first simulated seismic reflection signals that would have been recorded with the receivers moved from below the water bottom and placed along a new datum located above the water bottom with the velocity of the medium between the water bottom and the receivers at the new datum being that of the earth medium below the water bottom. Third simulated seismic reflection signals are produced from the second simulated seismic reflection signals that would have been recorded with the receivers located along the new datum and the shots moved from within the water layer and placed at a location below the water bottom. Fourth simulated seismic reflection signals are produced from the third simulated seismic reflection signals that would have been recorded with the shots moved from below the water bottom and placed along the new datum with the velocity of the medium between the water bottom and the shots at the new datum being that of the earth medium below the water bottom. These fourth simulated seismic reflection signals represent the originally recorded seismic reflection signals enhanced through the elimination of undulating water bottom distortions.

DESCRIPTION OF THE PREFERRED EMBODIMENT

The present invention provides a method for correcting for undulating water bottom distortion of seismic reflection signals by water layer replacement.

If the water layer has little velocity contrast with the immediate subwater bottom medium, the seismic wave front penetrating through the medium would remain spherical. The subsequent seismic reflections from deep reflecting interfaces would then display the familiar hyperbolic moveout time delay. However, the typical situation is shown in FIG. 1.

Figure 1:
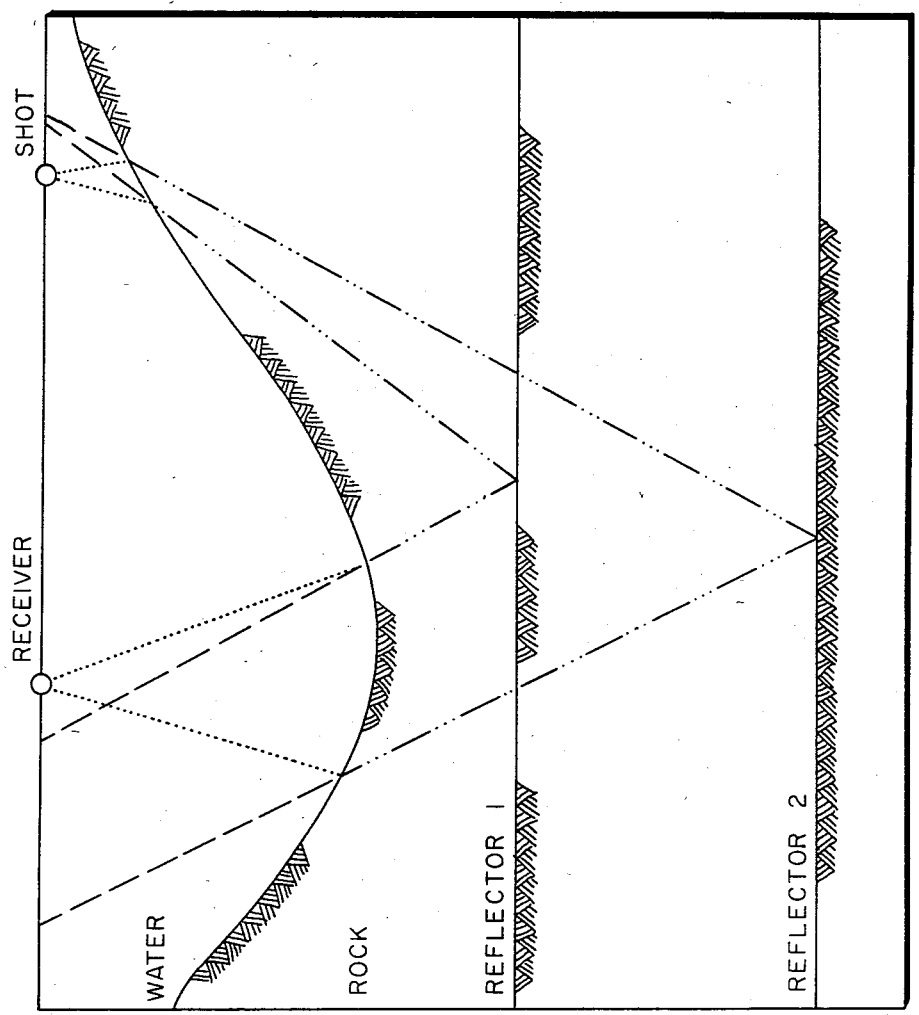
FIG. 1 illustrates seismic reflection paths in a marine exploration operation.

Referring now to FIG. 1, there is shown a typical situation wherein a marine seismic survey is carried out over an undulating water bottom. The initial seismic reflection paths, shown as dotted lines, are bent at the water bottom following Snell's Law of refraction. Even though the reflecting interfaces are flat, the reflection points do not coincide with the midpoints between shot and receiver locations. In accordance with the present invention, the seismic reflection paths are effectively replaced by the dashed lines in FIG. 1. Carrying the same geophysical reflection information, these dashed reflection paths coincide with the initial reflection paths in the below water bottom medium, but deviate from them in the water layer. This occurs because the initial reflection paths bend at the water bottom due to the velocity contrast at the interface. After reflection path replacement, there is no velocity contrast at the water bottom and the reflection paths go straight through.

Figure 2A:
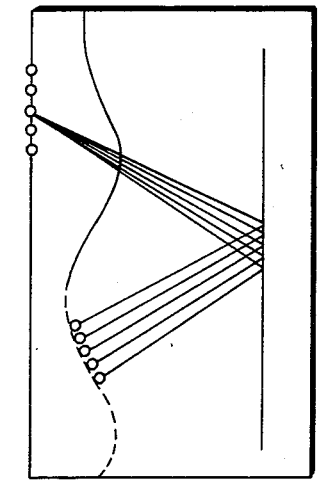
FIGS. 2A-2D illustrate the processing of common receiver seismic reflection signals to a new datum location in a marine seismic exploration operation.
Figure 2C:
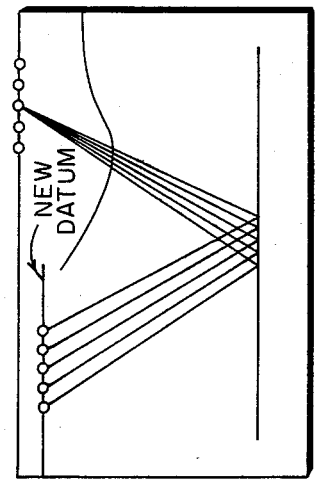
Figure 2B:
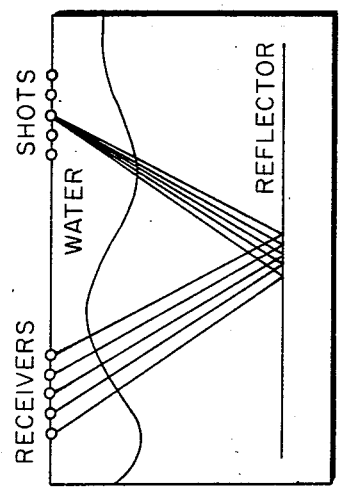
Figure 2D:
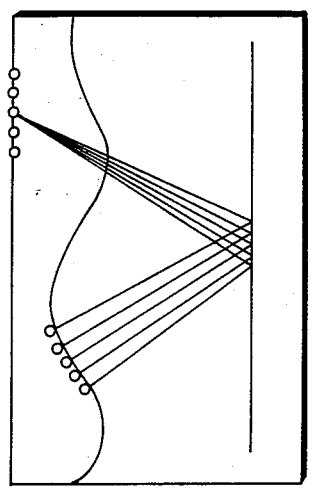
Figure 2E:
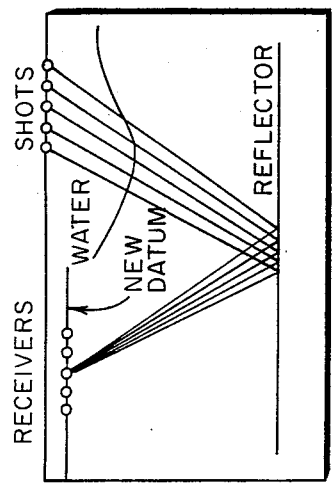
FIGS. 2E-2H illustrate the processing of common shot point seismic reflection signals to a new datum location in a marine seismic exploration operation.

Referring now to FIGS. 2A-2H, there is illustrated the water layer replacement process of the present invention. FIG. 2A shows a typical situation where CDP marine seismic data are collected over an undulating water bottom. For simplicity, seismic reflection paths are shown as straight in crossing the water bottom interface. Distortions to the reflection paths occur at two separated places, first on the downgoing path near the shot locations then on the upcoming path near the receiver locations. In FIGS. 2B and 2C simulated common shot seismic reflection signals are shown with reduced reflection paths. In FIG. 2B, the upgoing reflection path has been effectively decreased or downward continued from the surface to the water bottom by removing the water layer velocity effect. This downward continued path is treated as if the receivers were displaced from within the water layer and planted at simulated receiver points along the water bottom. In FIG. 2C, the simulated receiver points are further displaced across the water bottom to simulated receiver points immediately below the water bottom. In FIG. 2D the simulated common shot seismic reflection signals are shown with increased reflection path from that of FIG. 2C. The upgoing reflection path has been increased or upward continued by treating the simulated receiver points as if they were displaced upward and planted at simulated receiver points along a new datum. In this upward continuation process, the water layer is effectively replaced with a velocity to match the water bottom rock velocity. In this manner, distortions incurred on the receiver side of the seismic reflection path for a common shot gather have been removed.

Figure 2F:
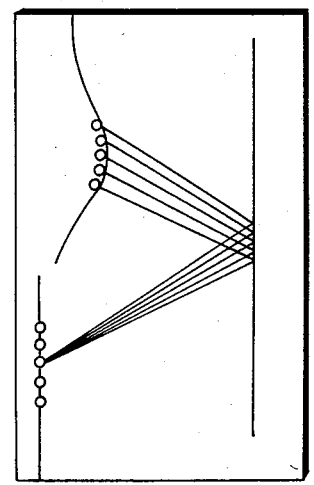
Figure 2G:
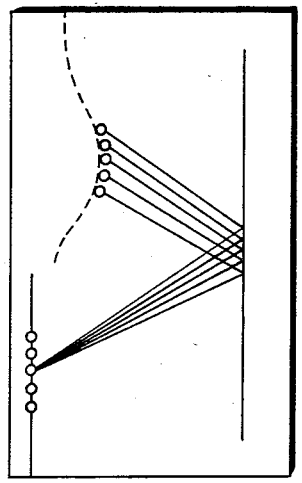
Figure 2H:
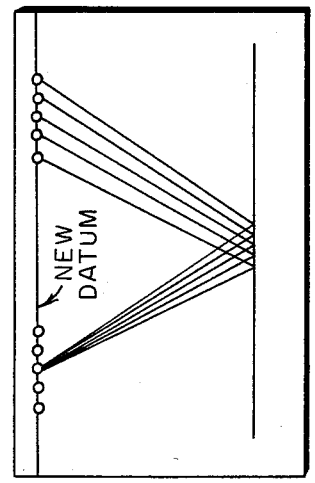
Figure 3:
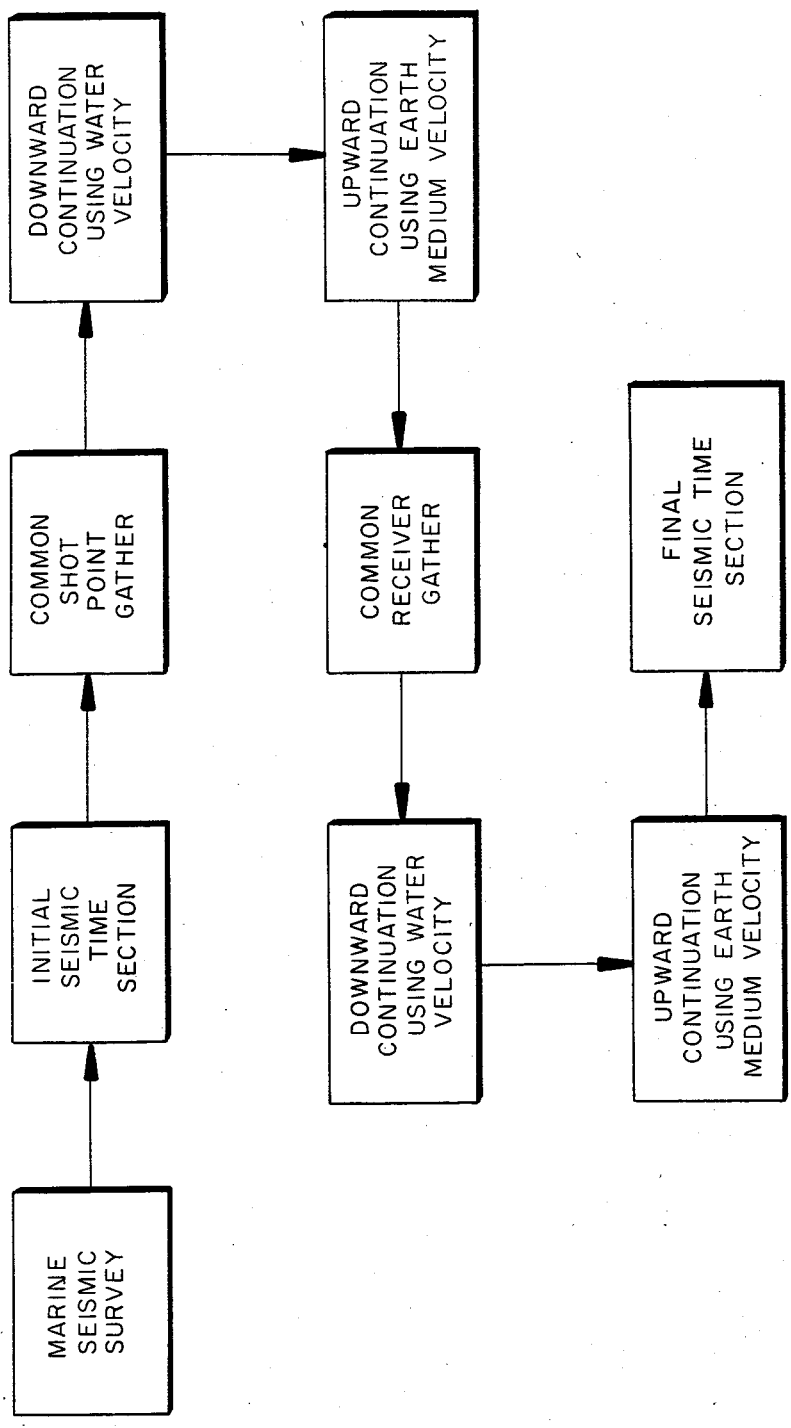
FIG. 3 is a flow chart of the process of the present invention for shifting the seismic reflection signals to a new datum location as shown in FIGS. 2A-2H.

Next, the water layer replacement process is repeated for common receiver gathers utilizing the simulated common receiver points along the new datum as shown in FIGS. 2E–2H. In FIGS. 2F and 2G simulated common receiver seismic reflection signals are shown with reduced reflection paths. In FIG. 2F, the downgoing reflection path has been decreased or downward continued from the surface to the water bottom by removing the water layer velocity effect. This downward continued path is treated as if the shots were displaced from within the water layer and planted at simulated shot points along the water bottom. In FIG. G, the simulated shot points are displaced across the water bottom to simulated shot points immediately below the water bottom. In FIG. 2H the simulated common receiver seismic reflection signals are shown with increased paths from that of FIG. 2G. The reflection path has been increased or upward continued by treating the simulated shot points as if they were displaced and planted at simulated shot points along the new datum. In this upward continuation process, the water layer is effectively replaced with a velocity to match the water bottom rock velocity. In this manner, distortions incurred on the shot side of the seismic reflection path for a common receiver gather have been removed. The final seismic time section created by the water layer replacement process of the present invention can now be processed by conventional data processing techniques, the seismic reflection signals now appearing to have been collected on the new datum over the replaced water layer without having experienced water bottom distortion. The foregoing described process is further illustrated in the flow chart of FIG. 3.

Downward computation operation by which a wave field at any depth level can be computed from a known field specified at a different level. The field recorded upcoming wave is initially transformed into the frequency domain. This is carried out by applying the Fourier transform to the differential equation with respect to the time variable t and only the signal frequency band is kept. A finite difference operation is then applied to the x-z variables for each of the kept frequency components. Such operation includes a split-step time-sharing finite difference algorithm for efficient computation.

More particularly, the downward continuation of an upcoming wave is carried out in accordance with the following described expressions. From the upcoming wave measured on the surface $U_s(x, z=o, t)$, where s represents shot location, the upcoming wave over the whole depth is computed by use of the following total velocity gradient upcoming wave equation $$\frac{\partial^3 u}{\partial z \partial t^2} + \frac{3V}{4} \frac{\partial^3 U}{\partial t \partial x^2} - \frac{V^2}{4} \frac{\partial^3 U}{\partial z \partial x} - \frac{1}{V} \frac{\partial^3 U}{\partial t^3} = 0 \quad (1)$$

where V, the velocity of the earth medium may vary in both x, the lateral distance variable; and z the depth variable. To accommodate for lateral velocity variations, a split-step algorithm is implemented in the frequency domain wherein equation (1) is split into two equations:

$$\omega^2 \frac{\partial \tilde{U}}{\partial z} + \frac{V^2}{4} \frac{\partial^3 \tilde{U}}{\partial z \partial x^2} - \frac{jV\omega}{2} \frac{\partial^2 U}{\partial x^2} = 0 \quad (2)$$

and $$\frac{\partial U}{\partial z} - \frac{j\omega}{V} \tilde{U} = 0 \quad (3)$$

where $$\tilde{U}_{(x,z,w)} = \int_\alpha^\alpha U(x,z,t)e^{-j\omega t}dt \quad (4)$$

Numerically, equation (2) is implemented with a Crank-Nicolson type finite difference scheme, and equation (3) is directly solved for each depth increment. For a more detailed discussion of splitting-up techniques, reference is made to Marchuk, G. I. (1975), *Methods of Numerical Mathematics*, Springer-Verlag and to Kjartansson, E. (1978), "Modeling and Migration with the Monochromatic Wave Equation—Variable Velocity and Attenuation", *Stanford Exploration Project* (Stanford, Calif.: Leland Stanford Junior University) Report No. 15.

From the foregoing it will be apparent that the migration method of the present invention can be practiced either with the use of analog computing apparatus such as delay lines, shift registers, drum recorders, contour plotters, etc., or with the use of digital computing apparatus. In one particular embodiment of a digital computing system a Control Data Corporation Model 6600 General Purpose Digital Computer is utilized along with the following input/output components:

Control Computer, 65K Memory
6602 Console Display
6681 Data Channel Converter
405 Card Reader
3447 Card Reader Controller
501 Line Printer
3256 Line Printer Controller The foregoing has described the method of the present invention. It is to be understood that various modifications to the disclosed embodiment, as well as alternative embodiments, may become apparent to one skilled in the art without departing from the scope and spirit of the invention as hereinafter defined by the appended claims.

I claim:

1. In a seismic record section of marine seismic reflection signals from subsurface interfaces recorded at an exploration site having a water layer overlying an undulating water bottom and having the seismic shot points and receiver points located above the undulating water bottom, the method of enhancing the seismic record section by the removal of the distortion on the recorded seismic reflection signals caused by the undulating water bottom comprising the steps of:

(a) gathering together all common shot point seismic reflection signals, (b) decreasing the length of the upgoing reflection signal in all said common shot point seismic reflection signals, so as to simulate receiver points immediately below said undulating water bottom, thereby removing the velocity effect of the water layer from the recorded seismic reflection signals in all said common shot point seismic reflection signals, (c) increasing the length of the upgoing reflection signal in all said common shot point seismic reflection signals so as to simulate receiver points along a new horizontal datum above said undulating water bottom, thereby replacing the removed water layer velocity effect in all said common shot point seismic reflection signals with the velocity effect of the earth medium below the water bottom, (d) gathering together all common receiver point seismic reflection signals, (e) decreasing the length of the upgoing reflection signal in all said common receiver point seismic reflection signals so as to simulate shot points immediately below said undulating water bottom, thereby removing the velocity effect of the water layer from the recorded seismic reflection signals in all said common receiver point seismic reflection signals, (f) increasing the length of the upgoing reflection signal in all said common receiver point seismic reflection signals so as to simulate receiver points along a new horizontal datum above said undulating water bottom, thereby replacing the removed water layer velocity effect in all said common receiver point seismic reflection signals with the velocity effect of the earth medium below the water bottom, and (g) recording said velocity replaced seismic reflection signals to produce a seismic record section on which the undulating water bottom distortion has been removed.

* * * * *